United States Patent [19]

Axelrod et al.

[11] Patent Number: 4,800,505
[45] Date of Patent: Jan. 24, 1989

[54] MAIL PREPARATION SYSTEM

[75] Inventors: Barry H. Axelrod, Newtown; Robert T. Durst, Jr., Monroe; Kevin D. Hunter, Stratford; Leon A. Pintsov, West Hartford; William G. Hart, Stamford; Morton Silverberg, Westport, all of Conn.

[73] Assignee: Pitney Bowes Inc., Stamford, Conn.

[21] Appl. No.: 25,418

[22] Filed: Mar. 13, 1987

[51] Int. Cl.$^4$ .................. G06F 15/20; B65H 39/02
[52] U.S. Cl. ................... 364/478; 209/3.3; 209/584; 270/58; 270/1.1; 235/375; 364/464.03
[58] Field of Search ............ 364/464, 466, 478; 209/900, 569, 583, 584, 3.1–3.3; 270/1.1, 4, 5, 54, 58; 53/266 A; 235/375, 432

[56] References Cited

U.S. PATENT DOCUMENTS

| | | | |
|---|---|---|---|
| 4,194,685 | 3/1980 | Hill et al. ............... | 270/58 X |
| 4,384,196 | 5/1983 | McCumber et al. ..... | 270/58 X |
| 4,527,468 | 7/1985 | Piotroski ............... | 270/58 |
| 4,576,370 | 3/1986 | Jackson ................. | 270/58 X |
| 4,582,312 | 4/1986 | Abrams et al. .......... | 270/54 X |

*Primary Examiner*—Joseph Ruggiero
*Attorney, Agent, or Firm*—Donald P. Walker; David E. Pitchenik; Melvin J. Scolnick

[57] ABSTRACT

A system for the preparation of items to be mailed, preparation of each item varying in accordance with selected values of pre-determined parameters. The system includes apparatus for marking each item with selected identification code values; apparatus for preparing each item to be mailed in accordance with stored parameters, the preparing apparatus having a detector for detecting and outputting identification values from the items; a data base system for storing selected values of the parameters in associated with the identification codes, a control system responsive to the output identification codes to access the associated selected values for output to the preparation apparatus. The preparation apparatus of the subject system includes an inserted system and the pre-determined parameters include parameters defining the inserts to be assembled with an item. The preparation apparatus also includes a printer which is controlled to print information on the items in accordance with other pre-determined parameters. The identification codes are printed on control documents for each item by a data processing system which includes a post-processing subsystem for removing conventional dash codes and substituting identification codes, and transmitting records of the values of the pre-determined parameters to the data base system together with associated identification codes.

19 Claims, 3 Drawing Sheets

MAIL PREPARATION SYSTEM

BACKGROUND OF THE INVENTION

1. Field of the Invention

This invention relates to systems for the preparation of items to be mailed. More particularly, it relates to systems where the preparation for each item varies in accordance with selected values of pre-determined parameters.

Preparation of items to be mailed may include, but is not limited to, combinations of the following steps. The component elements of the item may be printed or otherwise prepared, appropriate elements comprising the item may be assembled, the assembled elements may be inserted into a carrier (e.g. an envelope), the carrier may be addressed (either before or after insertion of the elements), the appropriate zip code may be marked on the carrier in a machine readable code such as bar code, the proper postage amount for the item may be determined, and the item may be franked accordingly. Typically, high volume mailers have in the past, used systems for the preparation of items to be mailed which were based on a combination of electronic data processing operations and large inserter systems. Typically, the mailer's data processing operation would include systems for printing large batches of documents such as bills, bank statements, etc. on a periodic basis. These documents would generally be printed on conventional fan-fold computer printout paper and in addition to the human readable information intended for recipient would also include markings, referred to as "dash code" in the margins. The batch of documents would then be physically delivered to the mailroom for further preparation.

In the mailroom a "burster" would separate the fan-fold printout into discrete documents, generally referred to as "control documents", and feed these control documents to an inserter system. The burster also included a scanner which would read the dash code from the control documents and synchronously transmit this information to the inserter control system. The inserter control system would then use the information from the dash code to assemble selected inserts with the control documents and then insert the resulting assembly into an envelope. The envelope could then be transported through a conventional postage meter for franking. Such inserter systems are well known and are described in U.S. Pat. No. 4,571,925; for: Insertion Machine With Postage Categorization; to: Adams; issued: Feb. 25, 1986; which is hereby incorporated by reference. (As used herein "dash code" refers to conventional dash code and further includes other coding formats such as bar code and alphanumeric information readable by OCR, which may be used to control inserters).

Systems which include additional steps of mail preparation are also known. For example, a bar code printer may be included in the system to print the appropriate zip code in bar code on each envelope after insertion. The data processing system would be programmed to print the control document in a pre-determined sequence according to zip code and would include in the dash code a zip code break to indicate when to change to the next zip code. Systems where the weight of each item is computed from an a priori knowledge of the weight of each insert and the envelopes, the appropriate postage amount determined from the weight, and the postage meter setting accordingly (or, more typically, one of a plurality of preset meters selected), are also known.

Such systems while useful and highly successful suffer from several disadvantages Because the control information is printed on each control document as dash code, any change in the mail preparation, such as a change in the combination of inserts, requires that the control documents be reprinted; typically, a long lead time EDP operation. Also in systems where zip code bar code is printed, because of the limitations of the dash code, the zip code information for each control document can not be included in full on the control document. In prior art systems control documents would be printed in zip code sequence, as described above, and loss of the document indicating the zip code break could result in all the following items being mismarked. A particular disadvantage of prior art systems is that they are unable to print address information on items to be mailed and have been forced to rely on techniques such as window envelopes for addressing. This is a great disadvantage to direct marketers because the bill-like look of a window envelope greatly reduced the chances that the recipient will open an item of direct mail.

Thus, it is an object of the subject invention to provide a mail preparation system having a more flexible means of control.

It is another object of the subject invention to provide a mail preparation system with improved addressing capabilities.

It is another object of the subject invention to provide a mail preparation system with improved capabilities for printing zip code bar code on items to be mailed.

It is still another object of the subject invention to provide a mail preparation system with the ability to print classification pointer codes on components of an item to be mailed which are intended to be returned to the mailer (e.g. payment stubs) to assist in processing of returned mail.

It is still another object of the subject invention to provide mail processing system with improved

BRIEF SUMMARY OF THE INVENTION

The above objects are achieved and the disadvantages of the prior art are overcome in accordance with the subject invention by a system for preparing items to be mailed which includes a data base system for storing records of selected values of parameters for preparing items to be mailed, each of the records including an identification code; apparatus for marking items to be mailed with selected identification code values; apparatus for preparing items to be mailed in accordance with the stored parameters; the preparing apparatus including a detector for detecting and outputting the selected identification code values from the items to be mailed; and a control system responsive to the output identification code values received from the detector for accessing the records stored in the data base system which are associated with the output identification code values and outputting the selected parameter values stored in the accessed records to the preparing apparatus to control preparation of the items to be mailed.

In a preferred embodiment of the subject invention the preparing apparatus includes an inserter system and the parameters stored in the data base include insert parameters which define the inserts to be assembled with items to be mailed.

In another preferred embodiment of the subject invention the preparing apparatus includes a printer and the records in the data base include parameters defining the address for each item so that the printer may be controlled to print the address on items to be mailed.

In accordance with another aspect of the subject invention control documents for a batch of items to be mailed are prepared by an electronic data processing system which provides an output for controlling a line printer to print the documents. The data processing system further includes a subsystem for receiving the output to the line printer and modifying the output by removing dash code information, substituting an identification code, and outputting the modified information to the line printer. The subsystem also creates and transmits to the data base system a record associated with the identification code which may include information corresponding to the dash code, address information, zip code information, etc.

In still another preferred embodiment of the subject invention, components of an item to be mailed which are intended to be returned to the mailer may be marked with a classification pointer code to assist in processing returned mail.

Thus it may be seen that the subject invention advantageously achieves the above described objects and overcomes the disadvantages of the prior art. The subject invention is particularly advantageous in that the essentially unlimited storage available in a data base system allows a vastly increased amount of information to be associated with each control document. Thus address information, zip code, and classification pointer codes, as well as other information may be stored for each item to be mailed and printed after the item is assembled. It is also particularly advantageous that the stored information may be easily modified by conventional data base management techniques without the need to reprint the control documents. It is a still further advantage of the subject invention that the limited amount of information which need be printed on the control document as an identification code allows the identification code to be used in the form of an error correcting code; greatly reducing the probability of an error in mail preparation.

Other objects and advantages of the subject invention will be apparent to those skilled in the art from consideration of the attached drawing and the detailed description of the preferred embodiments set forth below.

DETAILED DESCRIPTION OF THE PREFERRED EMBODIMENT

Figure 1:
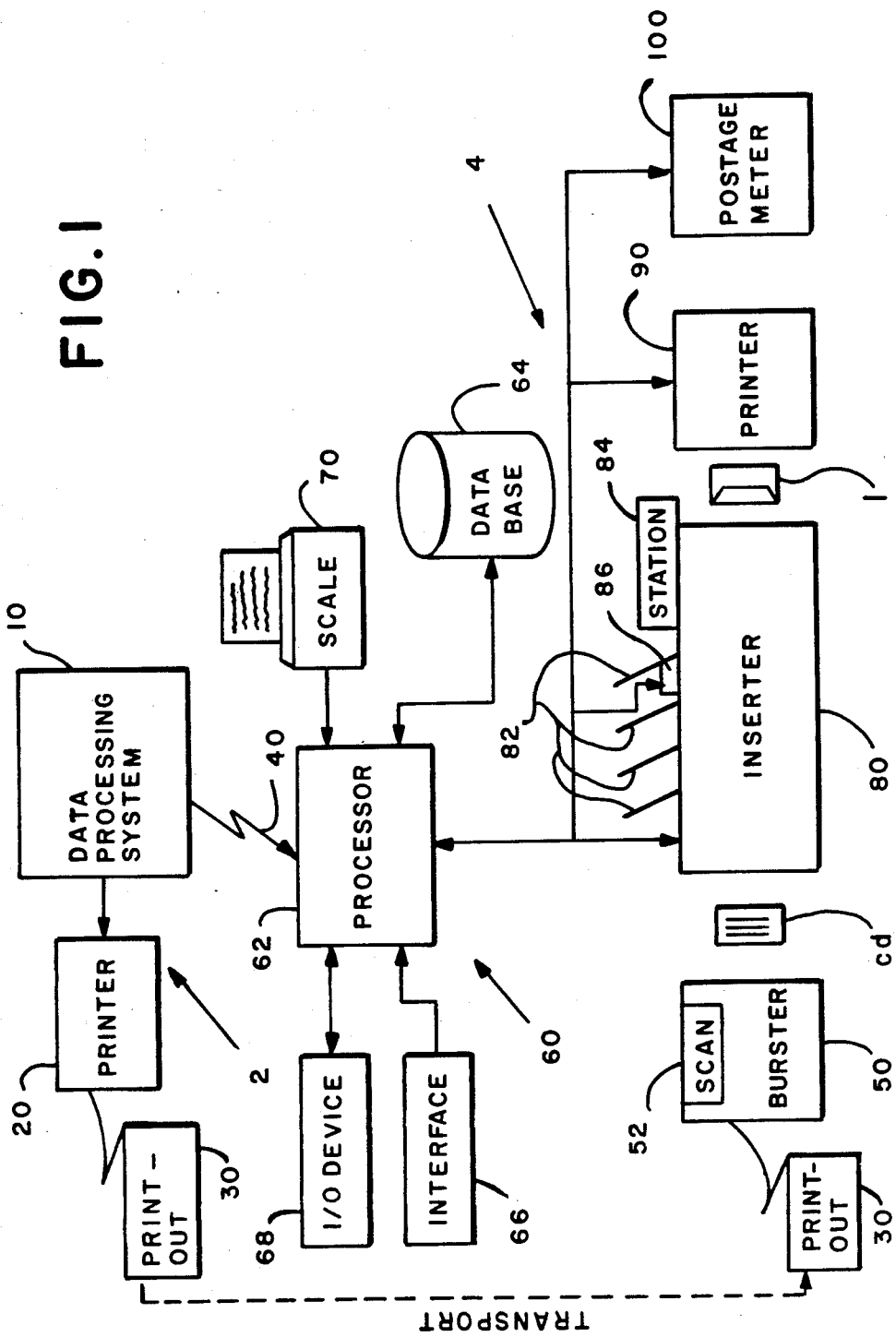
FIG. 1 shows a schematic block diagram of a mail preparation system in accordance with the subject invention.

FIG. 1 shows a mail preparation system which includes a control document printing system 2 and an inserter system 4. System 2 comprises a conventional electronic data processing system 10 which controls a conventional line printer 20 to print batches of control documents such as utility bills, bank statements, etc. in the form of fan fold computer printout 30 in a manner which is well understood by those skilled in the data processing art and which need not be discussed further here for an understanding of the subject invention. Data processing system 10 is also programmed to generate records associated with selected values of identification codes and to print selected values of the identification codes on each control document in the form of dash code; which is preferably printed on the sprocket strips of the fan fold computer printout paper. Each record includes the particular value of the identification code selected, and may include, but is not limited to, dash code information for controlling an inserter, zip code information, classification pointer codes to be printed on components of an item to be mailed which are intended to be returned to the mailer (e.g. business return envelopes), and, where the identification code identifies the control documents uniquely, address information. These records are transmitted to inserter system 4 for use in further preparation of items to be mailed in a manner which will be described further below.

Communications link 40 may be any of a number of well known techniques for the communications of digital data including, but not limited to, electronic communication over telephone lines or over local area networks, or over dedicated communications lines, or may be simply the physical transfer of media such as tape or floppy discs.

Data processing system 10 may be formed by modification of existing data processing system programmed to produced control documents for use in conventional dash code controlled inserter systems by the addition of a post-processor subsystem which intercepts the control signals from system 10 to line printer 20 before they are transmitted and modifies them by removing the dash code and substituting an identification code before retransmitting the modified signals to line printer 20. The post-processor subsystem also generates the appropriate records associated with particular values of the identification codes, as described above, and transmits these to inserter system 4 over communications link 40. Operation of such a post-processor subsystem will be described in more detail below.

Printout 30 is then physically transported to inserter system 4 for further preparation. Printout 30 is separated into discrete control documents cd by conventional burster 50, which includes conventional scanner 52. Since control documents cd are physically identical to prior art control documents the separating and scanning operations carried out by burster 50 and scanner 52 are identical to those known in the prior art; except that scanner 52 transmits the identification code information to computer system 60, which controls the operation of inserter 4 in a manner which will be more fully described below. Details of the scanning of dash code are provided in commonly assigned patent application Ser. No. 770,127; to: Lorenzo; filed: Aug. 28, 1985, now U.S. Pat. No. 4,659,939. Computer system 60 comprises processor 62, data base 64, operator interface 66, which may be a conventional keyboard and display, and conventional I/O device 68, which may be a conventional tape drive or floppy disc drive. Computer 60 also communicates with electronic scale 70 to receive information for determining the weights of inserts, as will be further described below. Electronic scales with communications capability such as the model EMS-5 scale marketed by Pitney Bowes Inc. of Stamford, Conn., are well known and need not be described further here for an understanding of the subject invention.

Computer system 60 receives the identification code information from control document cd and accesses the associated record, preferably randomly, stored in data base 64. System 60 then generates control signals to control inserter 80 and other subsystems as will be described more fully below.

After separation, control document cd is transported through conventional inserter system 80 Inserter system 80 comprises a plurality of insert feed stations 82 and an inserter station 84. At each of stations 82 an insert may be assembled with control document cd in response to control signals from processor 62. Typical inserts would be advertising flyers, business return envelopes, etc. At insert station 84 the components of an item to be mailed are assembled by insertion of the inserts and the control document into an envelope to form item i.

Those skilled in the art will readily recognize that the signals generated by processor 62 for control of inserter 80 may be identical to those generated in the prior art and that accordingly the design and function of inserter 80 may be conventional. This is particularly advantageous since as a result existing mail preparation systems may be combined in accordance with the present teachings with the above described post-processing subsystem and computer system 60 to form the subject invention.

A more detailed description of the operation of conventional inserters and bursters such as inserter 80 and burster 50 is given in U.S. Pat. No.: 4,527,468, to: Piotrosky; for: Apparatus For Separating Multiple Webs Of Documents Into Discrete Documents And Forming The Discrete Documents Into Batches; issued: July 9, 1985.

After insertion item i is transported through conventional printer 90 which operates under the control of processor 62. In one embodiment of the subject invention printer 90 may be a conventional bar code printer which is controlled to print the appropriate zip code in bar code format on item i. In another embodiment printer 90 may be a conventional character printer which is controlled to print the address on item i. And of course, in another embodiment printer 90 may combine character and bar code printing capabilities to print both the address and the zip code.

After printer 90, item i is transported through conventional electronic postage meter 100, such as the model number 6500 marketed by Pitney Bowes Inc. of Stamford, Conn., which is controlled by processor 62 to frank item i with indicia corresponding to the appropriate postage amount. In systems where inserter 80 produces items at a rate faster than that in which meter 100 can be reset a plurality of preset meters may be arranged so that as item i passes through them in sequence the appropriate meter is tripped under the control of processor 62 to properly frank item i. Details of electronic control of postage meters are provided in U.S. Pat. No.: 4,301,507; to: Soderberg et al.; for: Electronic Postage Meter Having Plural Computing Systems; issued: Nov. 17, 1981; which is hereby incorporated by reference.

In another preferred embodiment of the subject invention one or more of insert stations 82 may be modified by the addition of a conventional print mechanism, such as an ink jet printer operating under control of processor 62 to print inserts such as business return envelopes with characterizing pointer codes in machine readable form. Such characterizing pointer codes could then be scanned when return mail was processed and the characterizing pointer codes scanned from the returned mail used to access a data base to retrieve information to be used to assist in processing the return mail. Details of such a system for processing return mail are given in the commonly assigned U.S. patent application Ser. No. 025,304 filed on even date herewith; to: Durst et al.; for: Letter Processing Apparatus.

Figure 2:
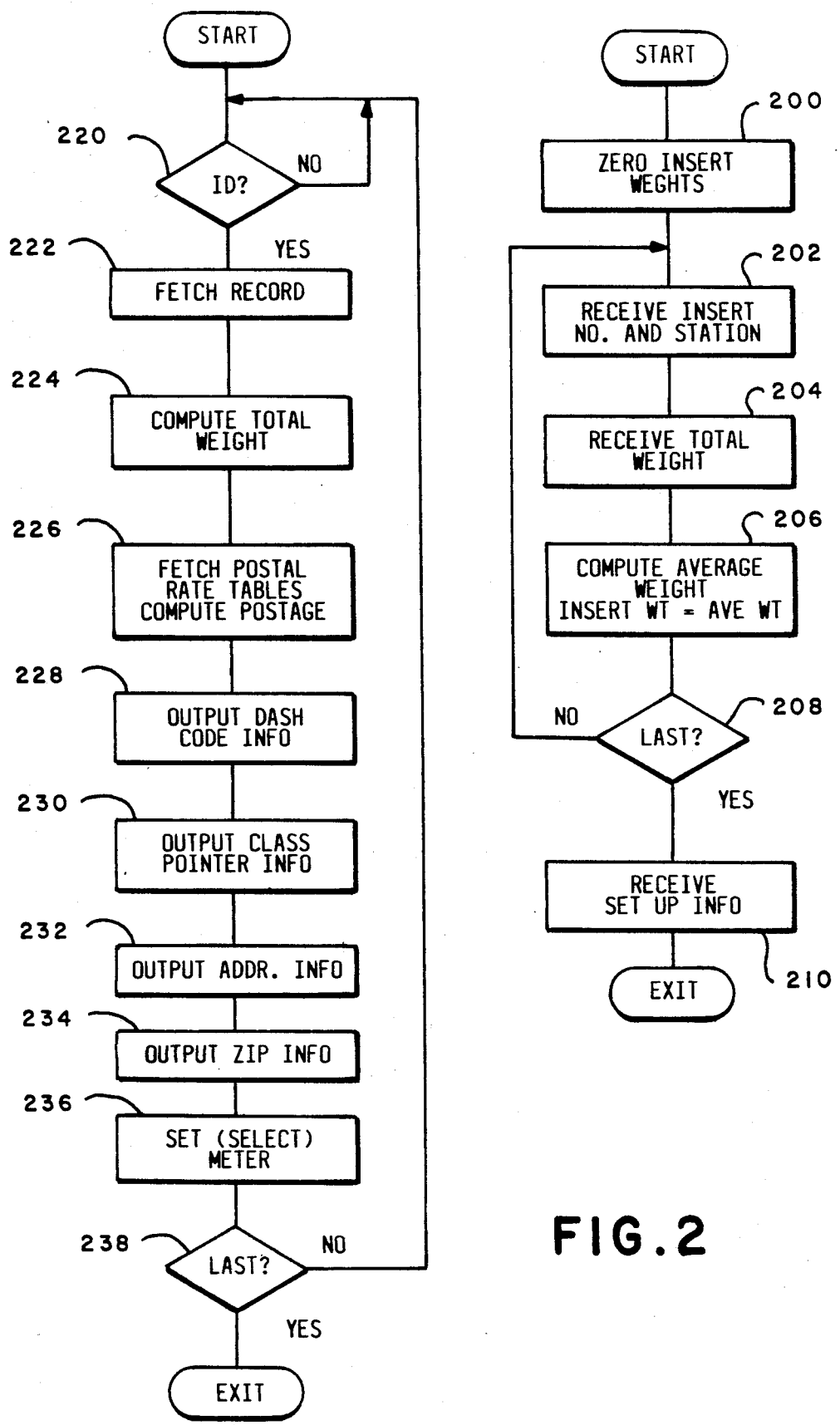
FIG. 2 is a flow chart of the control of a mail preparation system in accordance with the subject invention.

FIG. 2 shows a flow chart of the operation of computer system 60. To initialize the system an operator first places a known number of inserts to be inserted in items to be mailed by inserter 80 on scale 70 and issues a start up command through operator interface 66. At 200 processor 62 will set all values for the weight of inserts to zero. At 202 the operator enters the number of inserts on scale 70 and the particular insert station 82 for which they are intended. At 204 processor 62 receives the total weight of the inserts from scale 70. At 206 processor 62 computes the weight of the inserts and sets the insert weight for the identified station equal to that weight. At 208 processor 62 tests to determine if that was the last insert to be weighed. If not it returns to 202 to determine the next insert weight. If it is the last insert weight the operator enters additional set-up information such as class of service or known insert weights, if necessary, and at 210 processor 62 exits. Preferably the weight of the inserts is computed by determining the average weight and adding corrections for the error of scale 70 and variance in the insert weight to assure that no insert weighs more than the computed weight.

At sometime prior to further preparation of the items to be mailed data processing system 10 will transmit records for the items to be mailed to processor 62 over communications link 40. Using well known conventional data base management techniques processor 62 will store these records in data base 64.

As the next step in preparation of the items to be mailed printout 30 will be delivered to inserter system 4. Once the operator has properly attached printout 30 to burster 50 he may enter a start command through interface 66 and at 220 processor 62 waits for the first identification code to be transmitted by scanner 52. At 222 processor 62 fetches the record corresponding to the received identification code. At 224 processor 62 computes the total weight for the item to be mailed using the weights determined in the above described initialization routine and the dash code information defining which inserts are to be assembled in that item. At 226 the processor accesses an appropriate previously stored postal rate chart to determine the appropriate postage amount in accordance with the weight of the item to be mailed. At 228 processor 62 outputs dash code information to inserter 80 to control assembly of the item to be mailed. At 230 processor 62 controls print mechanism 86 to print a machine readable classification pointer code, determined from the record fetched at 222, on an insert such as a business return envelope to be inserted in the item to be mailed. At 232 processor 62 controls printer 90 to print address information determined from the record fetched at 222 on the item to be mailed. Similarly, at 234 processor 62 controls printer 90 to print zip code information in bar code form on the item to be mailed. At 236 processor 62 sets meter 100 to the postage amount determined at 224; or alternatively, selects the appropriate one of a plurality of preset meters. At 238 processor 62 tests 70 determine if that was the last item to be mailed. If not, it returns to 222, and if so it exits.

In another embodiment of the subject invention the identification codes need not define a randomly accessible record but need only define the sequence of control documents cd. Corresponding records would be stored in data base 64 in the same order and accessed sequentially. Upon detection of an out of sequence control document cd system 60 would halt and alert an operator to correct the error condition. Preferably, this technique (hereinafter referred to as sequential matching of control documents cd and associated records) is implemented with identification codes which are cyclically sequential, that is repeated after a preselected modulus. The modulus is selected large enough so that it is unlikely that an entire cycle of control documents cd could be displaced without detection, yet small enough to minimize the number of bits which need be printed on control documents for large runs of items.

In still another embodiment of the subject invention, the identification code information printed on control documents cd may include error detection or correction code, such as Hamming code, allowing detection or correction of errors in scanning of such identification code information. Hamming code and other techniques for detection or correction of errors in received information are well known and need not be described further here for an understanding of the subject invention.

In a preferred embodiment of the subject invention records for items to be mailed stored in data base 64 may be updated using well known conventional data base management techniques using either update information transmitted from data processing system 10 or input through I/O devices 66 and/or 68.

Those skilled in the art will readily recognize that for convenience of description the above descriptions have been given in terms of a single item to be mailed transported through inserter system 4. However, it is preferable, and easily within the skill of the person of ordinary skill in the art, to operate inserter system 4 in an interleaved fashion so that a sequence of items to be mailed is operated on concurrently at the various stations of inserter system 4.

Figure 3:
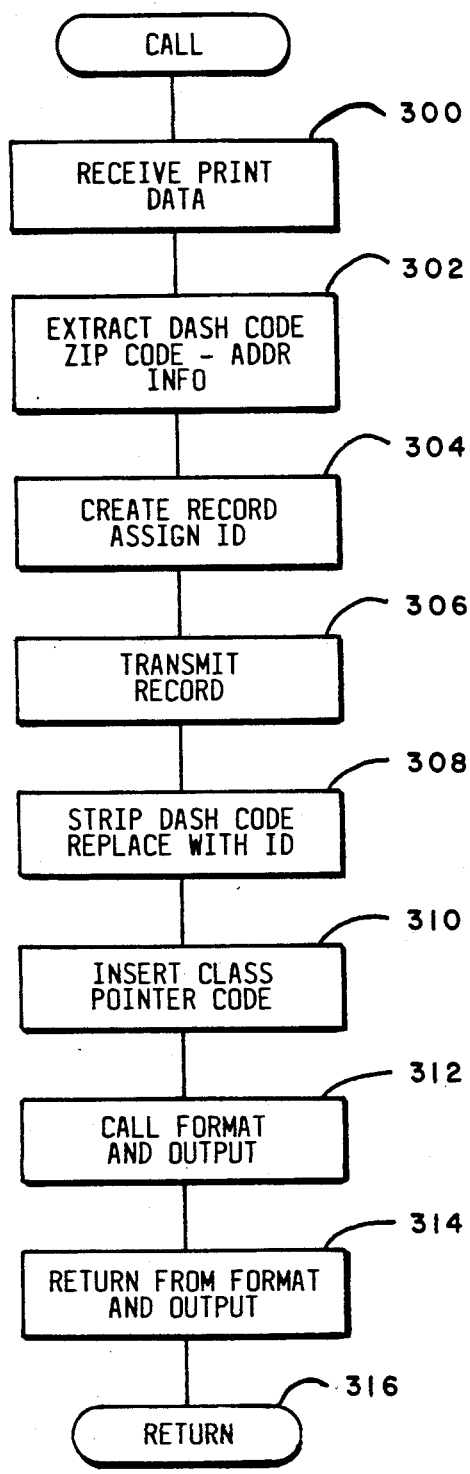
FIG. 3 is a flow chart of a data processing subsystem for modifying the information printed on control documents.

FIG. 3 shows a flow chart of the above described post-processing subsystem which may be incorporated in existing data processing systems for the generation of control documents with minimal software changes. For example, the subsystem shown might easily be incorporated in an existing system by replacing a call to a subsystem which formatted and outputted information for printing on a control document with a call to the subsystem shown. When the subsystem shown is called at 300 it would receive the data to be printed on the control document. At 302 it would determine the dash code information as well as address and zip code information and at 304 would create a record including the dash code information, address information, zip code information and classification pointer code information, then assign an identification code to the record. Classification pointer codes can be determined from a pre-established look-up table based on, for example, account numbers, or may even be simply account numbers At 306 a record is transmitted to processor 62. At 308 the dash codes are stripped from the print information and replaced with the identification code, which, as noted, is to be printed in dash code format. In cases where the control document or a portion of the control document comprises a component which is intended to be returned to the mailer, at 310 the classification pointer code may be added to the print information for printing on the control document. It should be noted in these cases some slight modification of the formatting of the control document may be necessary. At 312 the original subsystem for formatting and output of the print information is called. And at 314 the original subsystem returns and at 316 the subsystem shown returns.

(In other embodiments of the subject invention functions may have different sequences. For example record transmission, formatting, or printing may be performed for an entire batch of control documents after they are modified; instead of on a document by document basis as shown in FIG. 3.)

The embodiments described above and illustrated in the attached drawings have been given by way of example and illustration only. From the teachings of the present application those skilled in the art will readily recognize numerous other embodiments in accordance with the subject invention. Accordingly, limitations on the subject invention are to be found only in the claims set forth below.

DEFINITIONS

As used herein the following terms shall be defined as follows:

Control document—A document which is included in each item to be mailed prepared by an inserter system and which includes information scannable by the inserter system to determine the contents of the associated item. Control may be direct (as in the prior art) or indirect by accessing a pre-established data base (as in the subject invention).

Identification code—A code included on each control document in accordance with the subject invention, the particular value of the identification code associating a control document with a record in a pre-established data base containing information for processing items to be mailed.

Classification pointer code—A code included on items of return mail (e.g. return envelopes), the particular value of the classification pointer code associating an item of return mail with a record in a pre-established data base containing information for processing return mail.

What is claimed is:

1. A system for preparing items to be mailed comprising:
    (a) means for maintaining a data base, said data base comprising a plurality of records each of which includes selected values of parameters for preparing one of said items, each of said records including an identification code having values selected for identifying an addressee;
    (b) means for marking each of said items with the selected values of one of said identification codes;
    (c) means for preparing said items to be mailed in accordance with said parameters, said preparing means including means for detecting and outputting said selected identification code values from said items; and,
    (d) means responsive to each of said output identification code values for;
        (d1) accessing one of said records in accordance with said output identification code values included therein; and,
        (d2) outputting said selected parameter values from said one of said accessed records to said preparing means.

2. A system as described in claim 1 wherein said preparing means further comprises an inserter system and said parameters further comprise insert parameters defining inserts to be assembled with said items.

3. A system as described in claim 2 wherein said preparing means further comprises means for printing addresses and said parameters further comprise address parameters defining address information.

4. A system as described in claim 2 wherein said preparing means further comprises bar code printing means for printing zip codes in bar code format and said parameters further comprise zip code parameters defining zip code information.

5. A system as described in claim 2 wherein said system further comprises means for computing the appropriate postage amount for said items, said preparing means further comprises means for franking said items, said computing means controlling said franking means to frank said items with indicia corresponding to said appropriate postage amount.

6. A system as described in claim 5 further comprising means for determining the weights of components of said items and wherein said computing means determines the weight of said items as a function of the inserts assembled with said items as defined by said insert parameters and computes said appropriate postage amount as a function of said computed weight.

7. A system as described in claim 2 wherein said preparing means further comprises third print means for printing classification pointer codes on at least one of said inserts or on carriers for said items, and said parameters further comprise classification parameters defining classification pointer code information.

8. A system as described in claim 1 wherein said preparing means further comprises means for printing addresses and said parameters further comprise address parameters defining address information.

9. A system as described in claim 1 wherein said preparing means further comprises second print means for printing zip code information in bar code format and said parameters further comprise zip code parameters defining zip code information.

10. A system as described in claim 1 wherein said system further comprises means for computing appropriate postage amounts for said items, and said preparing means further comprises franking means for franking said items, said computing means controlling said franking means to frank said items with indicia corresponding to said appropriate postage amounts.

11. A system as described in claim 1 further comprising means for updating said data base.

12. A system as described in claim 1 wherein said identification code includes error detection or correction information, whereby said responsive means may further detect or correct errors in said output identification code values.

13. In a system of the type comprising a printer and an electronic data processing system for controlling said printer, said electronic data processing system controlling said printer to print control documents with selected information, said selected information including dash code for controlling further processing of an item to be mailed, said item comprising said control document, the improvement which comprises a post-processing subsystem for substituting identification code for said dash code on said control document, generating a record comprising said dash code information and said identification code, and outputting said record.

14. A system as described in claim 13 further comprising:
(a) means for maintaining a data base, said data base comprising records of selected values of parameters for preparing said items, each of said records including said identification code;
(b) means for preparing said items in accordance with said parameters, said preparing means including means for detecting and outputting identification code value from said items; and
(c) means responsive to said output identification code values for:
(c1) accessing each of said records in accordance with said output identification code values; and
(c2) outputting said selected values in said accessed records to said preparing means.

15. In a system as described in claim 13 the further improvement comprising means for printing classification pointer codes on portions of said control documents intended to be returned to the mailer of said items comprising said control documents.

16. A method for controlling an apparatus for preparing items to be mailed in accordance with parameters, comprising the steps of:
(a) maintaining a data base, said data base comprising a plurality of records each of which includes selected values of said parameters for preparing one of said items, each of said records including an identification code having values selected for identifying an addressee of a given item;
(b) accessing said data base in accordance with the selected values of each of said identification codes scanned from at least one component of each of said items; and
(c) outputting said selected values of parameters included with each of said selected identification code values from said accessed records to said preparing apparatus for preparing respective items to be mailed.

17. A method for preparing items to be mailed comprising the steps of:
(a) maintaining a data base, said data base comprising records of selected values of parameters for preparing said items, each of said records including an identification code;
(b) marking said items with selected values of said identification code;
(c) scanning said selected identification code values from said items;
(d) accessing said records in accordance with said scanned identification code values;
(e) outputting said selected values of said parameters to control apparatus for preparing said items to be mailed in accordance with said parameters.

18. A system for preparing items to be mailed comprising:
(a) means for maintaining a database, said data base comprising sequential records of selected values of parameters for preparing said items;
(b) means for marking said items with sequential values of an identification code corresponding to said sequence of records;
(c) means for preparing said items to be mailed in accordance with said parameters, said preparing means including means for detecting and outputting said selected identification code values from said items; and, (d) means responsive to said output identification code values for:
 (d1) sequentially matching said records and said items in accordance with said output identification code values;
 (d2) outputting said selected parameter values from said accessed records to said preparing mean; and
 (d3) halting preparation of said items and entering an error routine to alert an opeator in response to detection of an out of sequence item.

19. A system as described in claim 18 wherein said sequential values of said identification code are cyclic with a cycle having a preselected modules less than the number of said items.

* * * * *